(12) United States Patent
Gruich et al.

(10) Patent No.: US 6,267,699 B1
(45) Date of Patent: Jul. 31, 2001

(54) VARIABLE RATIO MAGNETIC DRIVE MECHANISM

(76) Inventors: James P. Gruich, 4066 W. Giles Rd., Muskegon, MI (US) 49445; Timothy M. Kurtz, 17778 North Shore Estates Dr., Spring Lake, MI (US) 49456

( * ) Notice: Subject to any disclaimer, the term of this patent is extended or adjusted under 35 U.S.C. 154(b) by 0 days.

(21) Appl. No.: 09/245,795

(22) Filed: Feb. 5, 1999

(51) Int. Cl.[7] .................................................. F16H 55/52
(52) U.S. Cl. ............................. 474/49; 474/52; 474/116; 474/50
(58) Field of Search ................................. 474/44, 47, 49, 474/50, 153, 52, 54, 56, 57, 116, 117

(56) References Cited

U.S. PATENT DOCUMENTS

| 2,782,649 | 2/1957 | Shortland . | |
| 2,827,795 | 3/1958 | Caballeros . | |
| 3,861,227 | 1/1975 | Hunt . | |
| 4,030,373 | 6/1977 | Leonard . | |
| 4,457,739 | 7/1984 | Iseman | 474/49 |
| 4,634,406 | 1/1987 | Hufschmid | 474/49 |
| 4,854,925 | 8/1989 | Chandrupatla | 474/212 |
| 4,913,685 | * 4/1990 | Lukatsch | 474/49 |
| 4,915,673 | 4/1990 | Krude | 474/49 |
| 4,969,857 | 11/1990 | Kumm | 474/49 |
| 5,013,284 | 5/1991 | Leonard | 474/52 |
| 5,443,423 | 8/1995 | Ha | 474/47 |
| 5,520,583 | * 5/1996 | Balingit et al. | 474/50 |
| 5,637,046 | 6/1997 | Ha | 474/53 |
| 5,984,814 | * 11/1999 | Davenport | 474/50 |

* cited by examiner

Primary Examiner—David A. Bucci
Assistant Examiner—Marcus Charles
(74) Attorney, Agent, or Firm—Price, Heneveld, Cooper, DeWitt & Litton (57) ABSTRACT

A drive mechanism of the type having a first pulley, a second pulley, and an endless flexible drive member extending therebetween for transmitting motion from the first pulley to the second pulley wherein at least one of the pulleys is a variable ratio pulley assembly. The variable ratio pulley assembly includes a planar and includes at least one circular row of apertures through the disk. At least one fixed magnet is affixed to the planar disk wherein the polar orientation of the fixed magnet is substantially transverse to the planar disk. A plurality of drive segments are positioned in the row of apertures and forms at least one circular row of drive segments wherein each of the segments is selectably translatable between a retracted position and an engaged position. Each of the segments includes an actuating magnet therein, and has a first end of a first polarity and a second end of a second polarity aligned parallel to the transverse axis and polarly oriented opposite to the polar orientation of the fixed magnet. An actuator selectively engages and retracts the circular row of drive segments.

28 Claims, 10 Drawing Sheets

VARIABLE RATIO MAGNETIC DRIVE MECHANISM

BACKGROUND OF THE INVENTION

The present invention relates to variable ratio drives, and in particular to drive systems generally comprising two pulleys spaced one from another with an endless flexible member extending therebetween for transferring motion from one pulley to the next and further wherein at least one of the pulleys can have its diameter selectably changed.

Drive systems incorporating two spaced apart pulleys interconnected by an endless flexible member are quite common and are often used to translate rotational motion from one member to another. By selecting differently sized pulleys, the translated rotational rate can be either increased or decreased depending on the pulley ratio selected. In some applications, most commonly as found on bicycles, a range of operating ratios is desired to provide the user with a variety of rotational rate transfers to optimize the application of power to speed. The most common of these systems incorporates a driving pulley or sprocket which may be one or more coaxially stacked pulleys and which by means of the endless flexible member translates the rotational motion to a second set of pulleys or sprockets of different but fixed diameters and also sequentially stacked.

While this type of system is quite common and has achieved wide ranging use, it can be noisy and the manner in which speeds are changed is accomplished by laterally forcing the chain or belt from one diameter sprocket to a laterally adjacent and coaxial different diameter sprocket. Depending upon the desired ratio, it is quite common for the endless flexible member to be engaged upon pulleys or sprockets which do not lie in the same plane. Such a skewed operation of the flexible member can result in premature wear, excessive noise, and unwanted gear ratio changes.

Various attempts have been made to develop improved drive systems which address the aforementioned problems. Some of these attempts include spaced cones with a flexible member between each cone, or single pulleys having a variable diameter by the mechanical repositioning and retention of various elements or pines. However, these attempts have either failed to solve the aforementioned problems, or were too complex and expensive to provide an efficient and cost effective drive system. Thus, there has remained a need for a reliable and efficient variable ratio drive system.

SUMMARY OF THE INVENTION

One aspect of the present invention is a drive mechanism of the type having a first pulley, a second pulley, and an endless flexible drive member extending therebetween for transmitting motion from the first pulley to the second pulley wherein at least one of the pulleys is a variable ratio pulley assembly. The variable ratio pulley assembly includes a substantially planar disk of a non-magnetic material and has an engagement face and an opposite retraction face and also includes at least one circular row of apertures through the disk. At least one fixed magnet is affixed to the planar disk wherein the polar orientation of the fixed magnet is substantially transverse to the planar disk. A plurality of drive segments of non-magnetic material are positioned in the row of apertures and forms at least one circular row of drive segments wherein each of the segments is selectably translatable along an axis transverse to the planar disk between a retracted position which is substantially flush with the engagement face and an engaged position which extends from the engagement face in a cantilevered fashion. Each of the segments includes an actuating magnet therein, and has a first end of a first polarity and a second end of a second polarity aligned parallel to the transverse axis and polarly oriented opposite to the polar orientation of the fixed magnet. An actuator selectively engages and retracts the circular row of drive segments.

Another aspect of the present invention is a drive mechanism of the type having a first pulley, a second pulley and an endless flexible drive member extending therebetween for transmitting motion from said first pulley to said second pulley. At least one of the pulleys is a variable ratio pulley assembly including a disk having at least one circular row of apertures and a drive segment in each of said apertures. Each drive segment is translatable between a retracted position and an extended position, and the drive segments are maintained in their retracted or extended positions by magnetic force. The assembly further includes an actuator further having a housing at least partially straddling and in a fixed relation to the disk. A yoke is slidably received in the housing and is slidable along a radial of said disk. The yoke has a retraction leg extending at least partially along one side of the disk and a retraction cam on an inner face of the retraction leg, and also has an extension leg extending at least partially along an opposite side of the disk and an extension cam on an inner face of the extension leg. An inner layer of low friction material is positioned between each of the arms of the yoke and the disk such that contact of one of the cams with the inner layer selectively causes at least a portion of the layer to sequentially contact the drive segments as the disk rotates.

Yet another aspect of the present invention is a variable ratio drive mechanism which includes a first variable ratio pulley comprising a substantially planar disk having first and second faces and further having at least one circular row of apertures through the disk. At least a first magnet is affixed to the disk and defines a first magnetic field having a first polarity. A plurality of drive segments in the apertures form at least one circular row of drive segments wherein each drive segment includes an actuating magnet aligned to define a second magnetic field of opposite polarities from the first magnetic field. Each drive segment is selectively translatable through its said aperture between an engaged position and a retracted position such that each drive segment is maintained in either selected engaged position or selected retracted position by the polarly opposite first and second magnetic fields. An actuator selectively engages and retracts individual ones of the drive segments. A second pulley is spaced apart from the first variable ratio pulley, and an endless flexible drive member extends from the first variable ratio pulley to the second pulley for transmitting motion between the first pulley and the second pulley.

Yet another aspect of the present invention is a method for varying the ratio of the drive mechanism including a first variable ratio pulley having at least two selectable operating diameters wherein at least a larger of the selectable diameters is defined by selectively translatable drive segments. An actuator has at least one cam surface and a second pulley is spaced apart from the first pulley. An endless flexible member extends between the first pulley and the second pulley for transfer of the desired motion. The method comprises the steps of rotating the first variable ratio pulley at a selected rate of rotation to drive the second pulley at a first rate of rotation. The diameter of translatable drive segments is maintained in a first of a selected engaged or retracted position by the repelling force of oppositely oriented magnetic fields defined by oppositely oriented magnets in a disk with a pulley and in each of the drive segments.

The actuator is translated along a radial of the first variable ratio pulley. The cam surface of the actuator is positioned in lateral registration with the diameter of translatable drive segments. A portion of the translatable drive segments is contacted by the actuator cam surface. Each of the drive segments is sequentially displaced by the actuator cam to overcome the repelling force as the first variable ratio pulley rotates. The oppositely oriented magnetic fields are allowed to interact in a manner to translate each of the drive segments by magnetic force after initial displacement of the segment by the actuator cam. The diameter of translatable drive segments is maintained in a second of the selected engaged or retracted positions by the opposite repelling force of the oppositely oriented magnetic fields defined by the oppositely oriented magnets in the disk of the pulley and in each of the drive segments to thereby change the operating diameter of the first variable ratio pulley. The first variable ratio pulley is continually rotated at the selected rate of rotation, and the second pulley is then allowed to rotate at a second rate of rotation as a result of the translation of the diameter of translatable drive segments.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
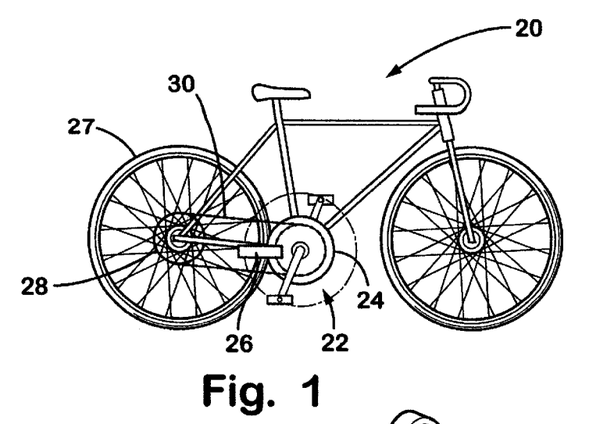
FIG. 1 is a side elevation view of a bicycle incorporating a variable ratio drive system embodying the present invention.
Figure 2:
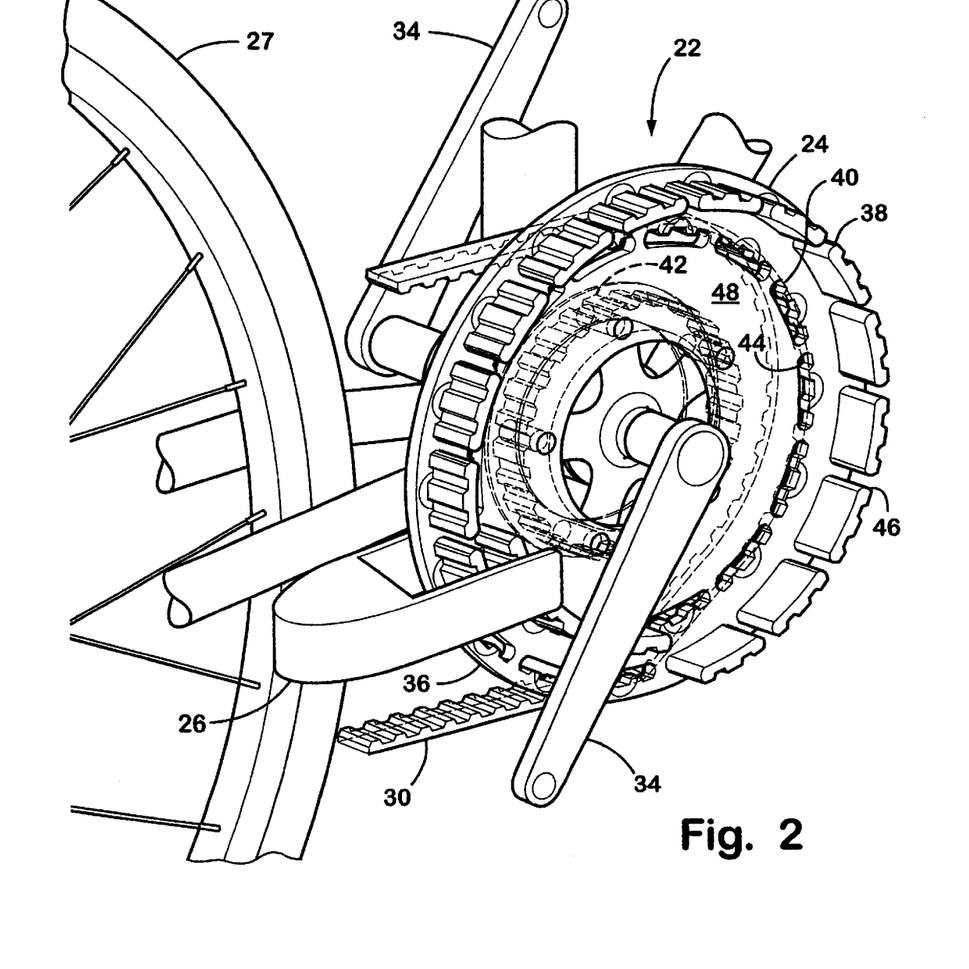
FIG. 2 is a perspective view of a variable ratio drive pulley incorporating two concentric circles of translatable drive segments and one fixed pulley attached thereto.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIGS. 1–3a show a variable ratio drive mechanism 22, which is one of the preferred embodiments of the present invention, and illustrates its various components.

Mechanism 22 in the illustrated embodiment is shown as the drive mechanism for bicycle 20 and comprises a front variable ratio drive 24 and an actuator 26 associated therewith. Front variable ratio drive 24 transfers rotational movement to rear variable ratio drive 28 affixed to rear wheel 27 of bicycle 20 utilizing endless flexible member 30.

Figure 3:
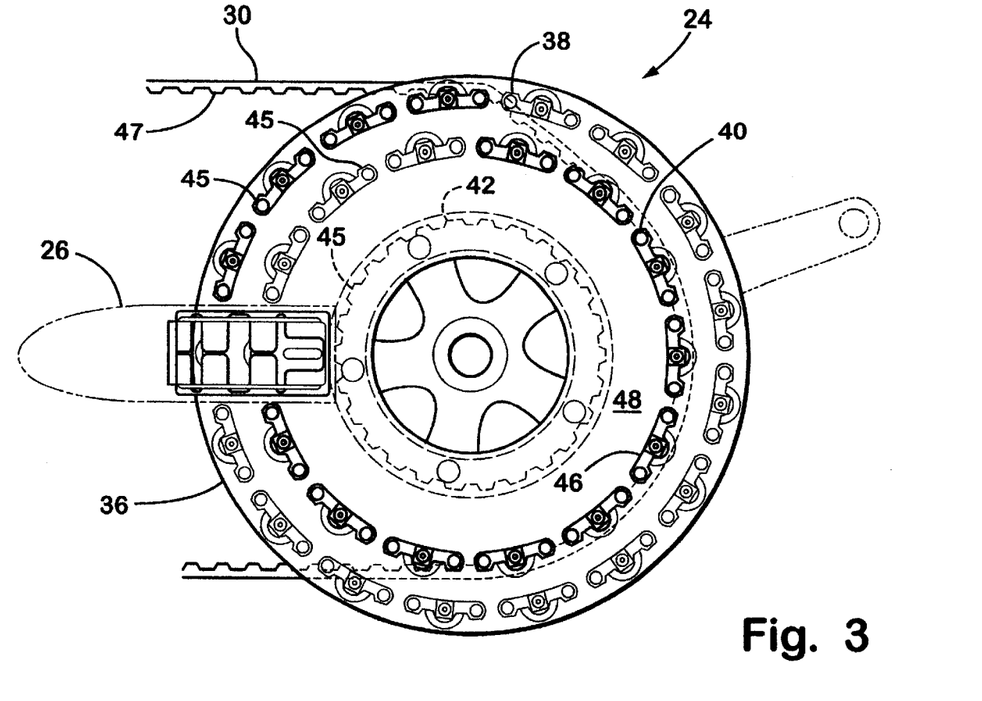
FIG. 3 is a side elevation view of the variable ratio drive pulley shown in FIG. 2.
Figure 3A:
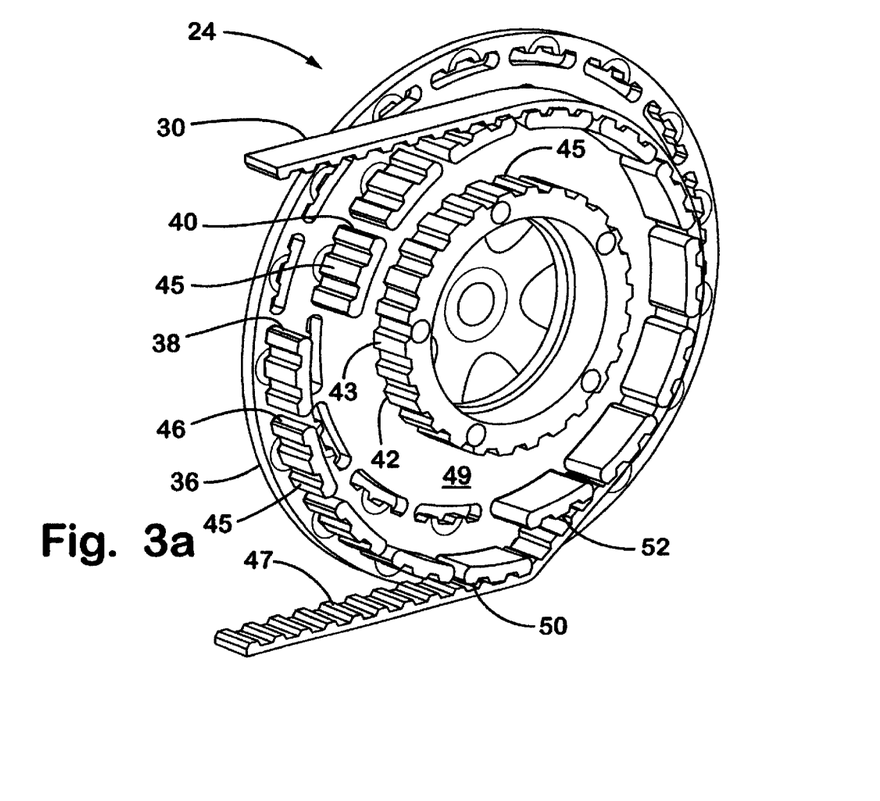
FIG. 3a is an opposite perspective view of the variable ratio pulley of FIG. 2 showing an endless flexible member transitioned between different diameters of translatable drive segments.

Referring to FIG. 2, front variable ratio drive 24 is shown in an enlarged perspective view. Power is imparted to front drive 24 when a bicycle user applies rotational force to bicycle crank arms 34. Crank arms 34 are rigidly affixed to front drive 24 so that one rotation of crank arms 34 always imparts one rotation of front drive 24. Front drive 24 is comprised of a planar disk 36 which is typically formed of a non-magnetic material. As shown in the embodiment of FIG. 2, front drive 24 includes an outer diameter or high gear 38, a middle gear 40, and a low gear 42. Middle gear 40 and high gear 38 are engaged by selectively translating drive segments 46 within apertures 44 from the retracted face 48 of disk 36 as shown in FIG. 2 to an engaged position extending in cantilevered fashion from engagement face 49 of disk 36 as shown in FIG. 3a. Low gear 42 comprises a fixed pulley 43 which is non-movably affixed to engagement face 49 of disk 36. As shown in the preferred embodiment, flexible endless member 30 is a cogged belt and drive segments 46 and fixed pulley 43 includes mating cogs 45 to facilitate positive engagement of gears 38, 40, and 42 with the cogs 47 of endless flexible member 30.

Those skilled in the art will appreciate that endless flexible member 30 can be a cogged belt, a V-belt, a chain, or other similar endless flexible members generally utilized with pulleys and sprockets. Also, those skilled in the art will appreciate that the configuration of drive elements 46 can also be varied to accommodate the specific configuration shown for the endless flexible member 30. Initiation of the translation of drive segments 46 between their engagement and retracted positions is accomplished by actuator 26 when drive segments 46 are not in contact with endless flexible member 30. A detailed operation of such translation will be discussed in greater detail below.

FIG. 3a illustrates the opposite side of the front variable ratio drive 24 rotated about a horizontal axis. As illustrated the variable ratio drive 24 as has been upshifted from middle gear 40 to high gear 38 as disk 36 rotates through actuator 26 (not shown in FIG. 3a), drive segments 46 of high gear 38 are extended to their engaged position to enter the path of endless flexible member 30. The first drive segment to so engage flexible member 30 is shown as drive segment 50 (disk 36 in FIG. 3a is rotating in a counterclockwise direction). Simultaneous with the translation of segments 46 to their engaged position of high gear 38 the drive segments 46 of middle gear 40 are translated to their retracted position. The last of the middle gear segments to be retracted is indicated at segment 52. It will be understood that the retraction of segments for the lower gears is optional and not mandatory for the operation of this embodiment.

Figure 4:
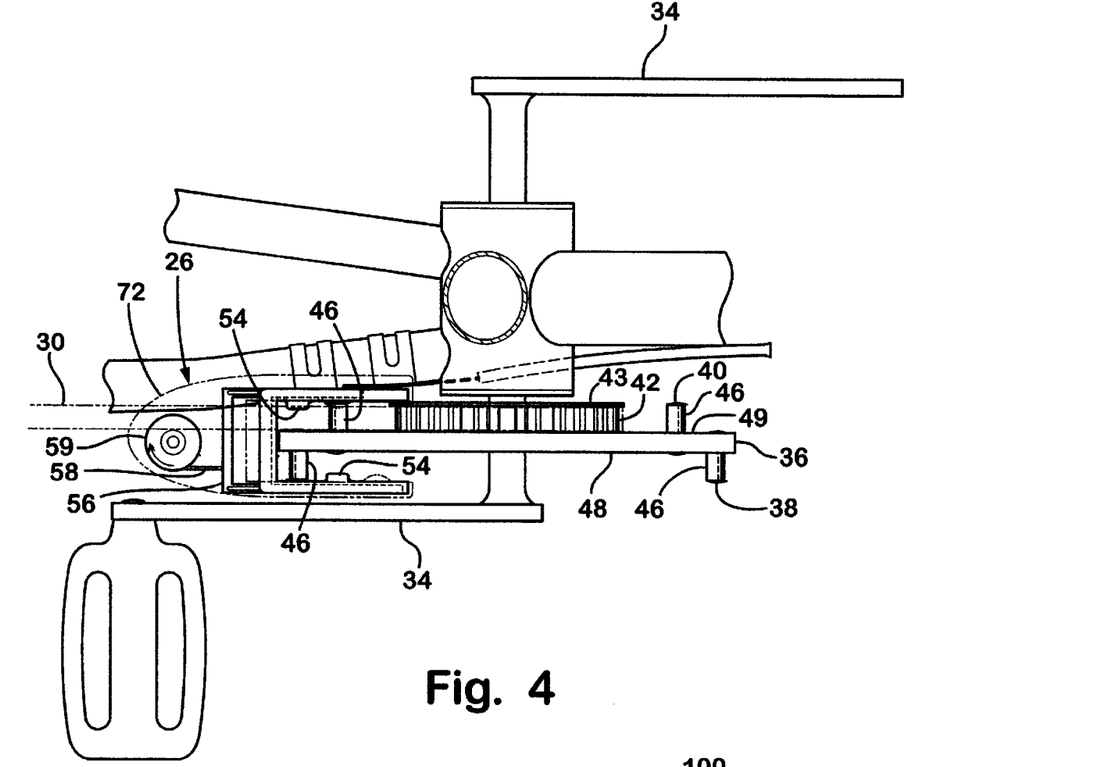
FIG. 4 is a top plan view of the variable ratio pulley showing the actuator yoke for extending and retracting the translatable segments.

Referring now to FIG. 4, front variable ratio drive 24 is shown in top plan view. Disk 36 is shown in substantially a vertical plane and parallel to the plane of operation of flexible member 30. Drive segments 46 for gear 38 are illustrated in their retracted positions while drive segments 46 for middle gear 40 are illustrated in their extended or engaged position. Actuator 26 is positioned to facilitate the radial translation of yoke 56 across faces 48 and 49 of disks 36. Yoke 56 of actuator 26 is translated radially by shift cable 60, wherein cam surfaces 54 on an internal portion of yoke 56 contact a portion of drive segments 46 as front drive 24 rotates therethrough. Cam surfaces 54 initiate displacement of drive segments 46 thereby inducing the translation of drive segments 46. The functionality and detailed interaction between actuator 26 and drive segments 46 is discussed more fully below.

Figure 5:
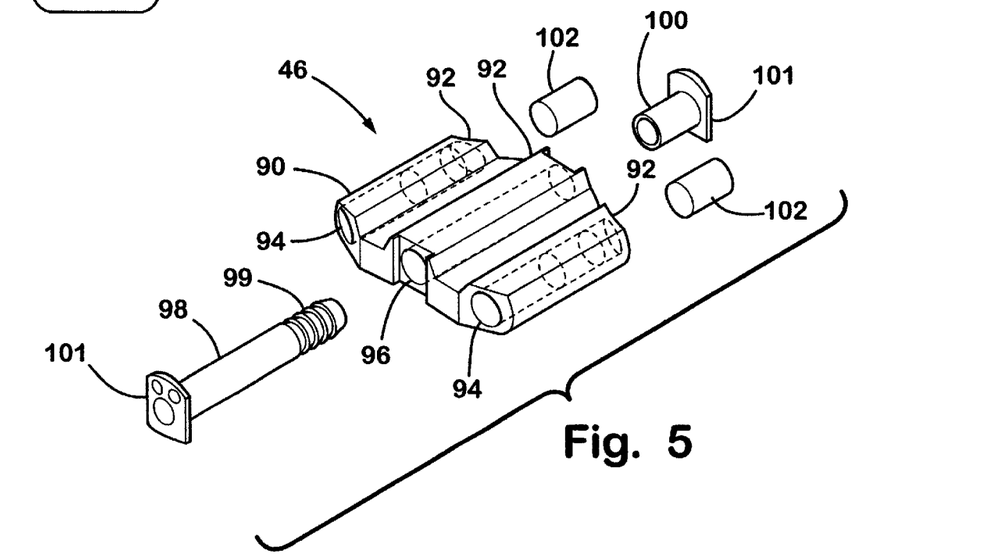
FIG. 5 is an exploded view of an embodiment of a translatable drive segment.

FIG. 5 illustrates in exploded form a drive segment 46. In the present embodiment, segment element 90 is formed to include cogs 92 for engagement with a cogged belt such as flexible member 30. Element 90 can be formed to interface with any configuration flexible member 30 as is desired by the user. Element 90 has outer bores 94 extending therethrough proximate to the ends of element 90 and central bore 96 through a central portion of element 90. Central bore 96 receives keeper 98 having a stop 101 at one end thereof and serrations 99 at an opposite end. A keeper retainer 100 telescopes over serrations 99 and also has a stop 101 at an opposite end. When drive segments 46 are positioned in apertures 44, drive segments extend from either face of disk 36 in a cantilevered fashion, and stops 101 retain drive segments 46 in apertures 44 preventing over-extension of drive segments 46. Actuator magnets 102 are closely received in outer bores 94, and are longitudinally positioned therealong to establish a desired positional relationship with disk 36.

Figure 6:
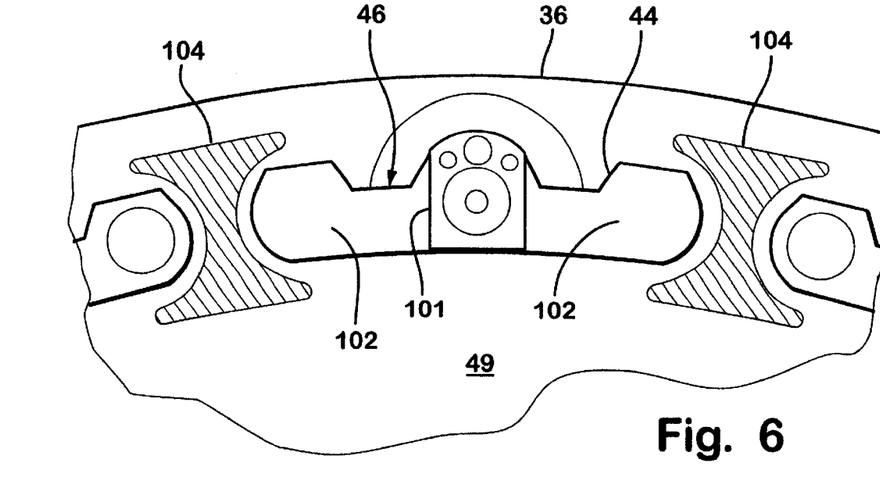
FIG. 6 is an enlarged elevation view of a translatable drive segment positioned in an aperture of the pulley disk.
Figure 7A:
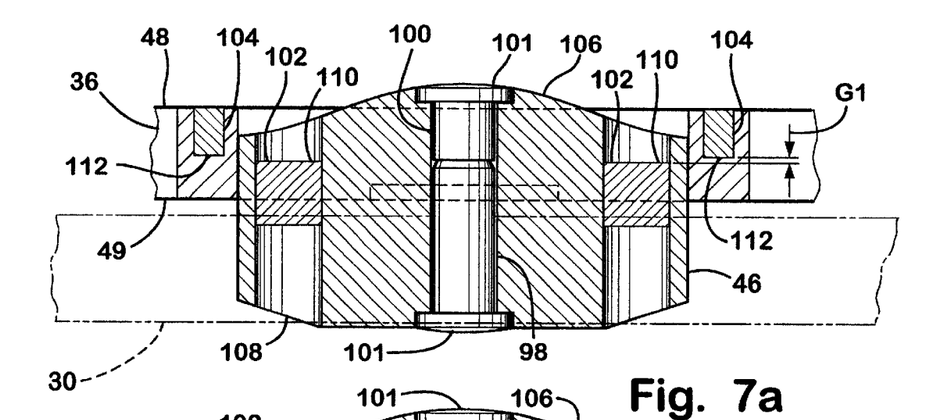
FIG. 7a is a horizontal cross-sectional view of the disk and segment shown in FIG. 6 taken along the line VII—VII, FIG. 6 illustrating the drive segment in its engaged position.
Figure 7B:
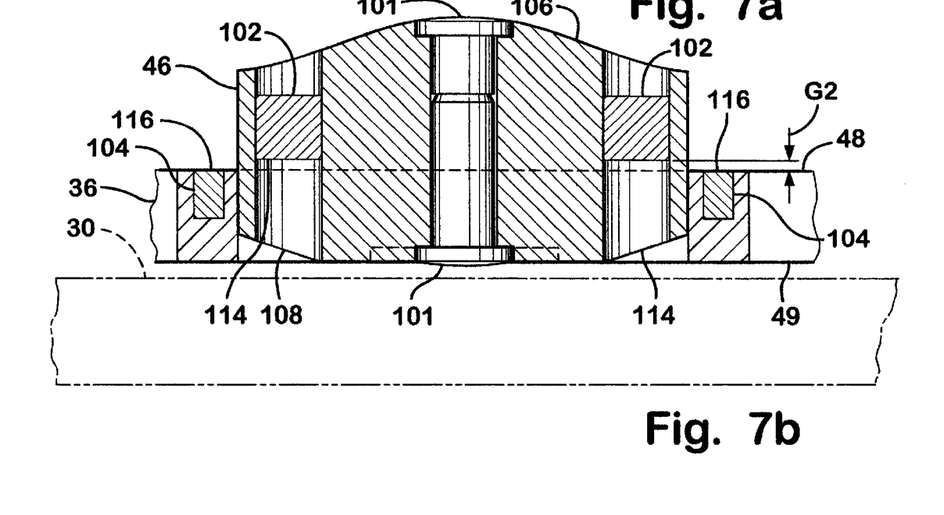
FIG. 7b is a horizontal cross-sectional view of the disk and segment shown in FIG. 6 taken along the line VII—VII, FIG. 6 illustrating the drive segment in its retracted position.

Turning now to FIGS. 6, 7a, and 7b, the installation of a drive segment 46 with respect to disk 36 is illustrated. FIG. 7a shows segment 46 in a position engaged with flexible member 30, and FIG. 7b shows segment 46 in its retracted position. As shown in FIG. 6, a drive magnet 104 is embedded in face 48 of disk 36. In the preferred embodiment, each magnet 104 is located within the diameter of apertures 44 of each gear and is located between adjacent ones of apertures 44. The polarity of magnets 104 is oriented opposite the polarity of actuator magnets 102 in segments 46. Magnets 102 and 104 are sized and positioned such that when segment 46 is in an engaged position as shown in FIG. 7a the proximate ends 110 and 112 of respective magnets 102 and 104 define a gap G1 therebetween. Since magnets 102 and 104 are oriented with opposite polarity, gap G1 is defined by like poles. Since like poles of proximate magnets tend to repel each other, the repelling force of end 110 of magnet 102 with respect to end 112 of magnet 104 will maintain segment 46 in an extended position. As gap G1 increases, the repelling force between magnets 102 and 104 also increases thereby allowing the designer to select the force desired to maintain segment 46 in its extended position.

In like manner, as shown in FIG. 7b, when drive segment 46 is in its retracted position, the size and positioning of magnets 102 and 104 are such to define a second gap G2 between the opposite ends 114 and 116 of the respective magnets 102 and 104. Again, the proximate ends 114 and 116 of magnets 102 and 104 have like polarity and thus tend to repel each other, and the repelling force between the magnets will maintain segment 46 in its retracted position. Since increasing gap G2 will increase the repelling force the designer can also select the force desired to maintain segment 46 in its retracted position. Those experienced with magnets will readily understand the necessary sizing a positioning of magnets 102 and 104, and such a discussion is not included. Since the inadvertent extension of a segment 46 is much less desirable than the inadvertent retraction of a segment 46, the preferred embodiment utilized a 2:1 ratio of G2 to G1 thereby providing a greater force maintaining retraction than maintaining extension. It will be understood that other gap ratios may be incorporated within the scope of the invention as suited to the designers needs.

Referring to FIGS. 7a and 7b, drive segment 46 translates through aperture 44 between limits of stops 101 of keeper 98. To effect translation, drive segment 46 need only be displaced slightly more than either G1 or G2 depending on whether retraction or extension of segment 46 is desired respectively. Once segment 46 has been displaced the desired distance greater that G1 or G2 the like poles of magnets 102 and 104 no longer defme a gap therebetween. The attractive forces of the opposite poles of magnets 102 and 104 begin to interact with each other (such as ends 110 and 116 or ends 114 and 112 of magnets 102 and 104 respectively) and accelerate segment 46 through aperture 44 wherein its translation momentum carries segment 46 to the limit of its travel as defined by stops 101. Once reaching stop 101, adjacent magnets 102 and 104 again define a gap and retain segment 46 in its opposite translated position until segment 46 is again displaced.

Referring again to FIG. 4 and also to FIGS. 8–12, the operation of the actuator is illustrated. Actuator 26 includes a housing 72 which slidingly receives yoke 56 therein. Yoke 56 has an extension arm 64 including an extension cam 66 on its inner surface, and a retraction arm 68 including a retraction cam 70 on its inner surface. Cam 66 and cam 70 are longitudinally displaced one from the other by the difference in the radii of each of the outer and middle gears 38 and 40 respectively. Shift cable 60 attaches to retraction arm 68 to effect the radial translation of yoke 56. Shift cable 60 is opposed by biasing member 59, which in the preferred embodiment is a coil spring. Thus, radial translation of yoke 56 can be readily effected in either desired direction by either increasing the force applied to cable 60 and thus overcoming the biasing force of spring 59 or by easing the force applied to cable 60 and thus allowing spring 59 to translate yoke 56.

Figure 8:
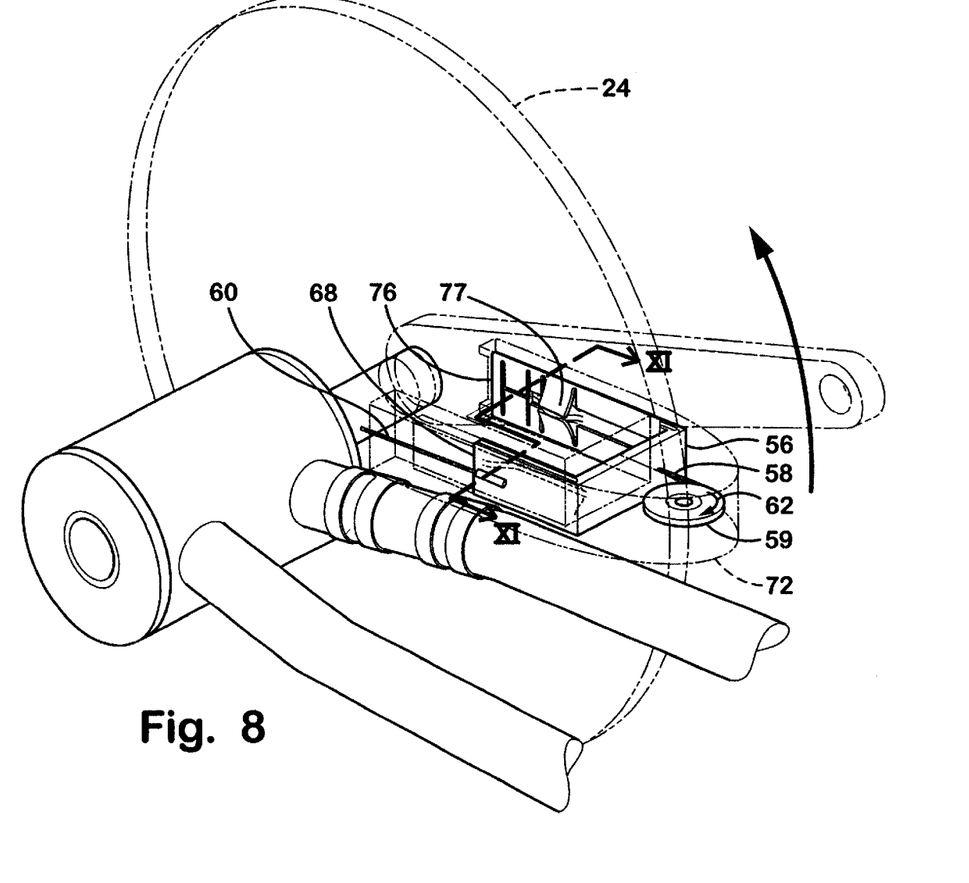
FIG. 8 is a perspective view of the actuator in its general relationship to the variable ratio pulley.
Figure 9:
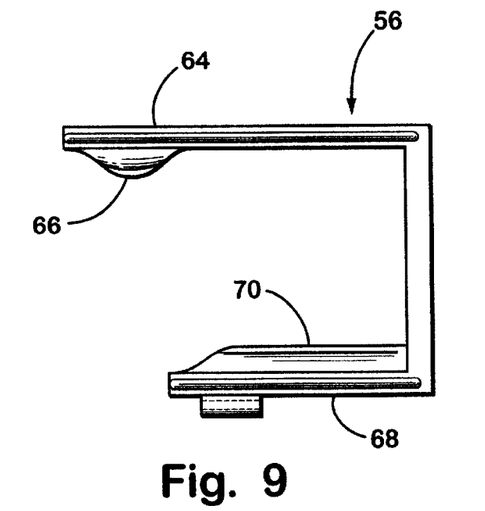
FIG. 9 is a top plan view of the actuator yoke.
Figure 10:
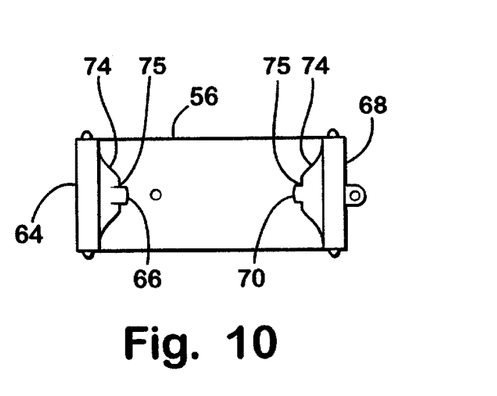
FIG. 10 is an end elevation view of the actuator yoke.
Figure 11:
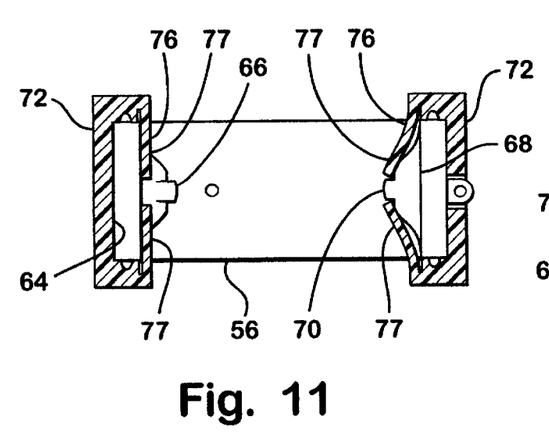
FIG. 11 is a fragmentary, cross-sectional view of the actuator, shown in FIG. 8, taken along the line XI—XI, FIG. 8.

Cam 66 is formed so that it can engage only one circular row of drive segments 46 at one time. Thus, only one circular row or gear can be extended at a time. However, when lower gears are desired, namely those with smaller diameters, all outer diameter gears (those segments 46 that are located on larger diameters) must be retracted. Therefore, retraction cam 70 extends the entire length of retraction arm 68 to facilitate the retraction of all segments 46 on a greater diameter than the gear which is desired to be engaged. As shown in FIG. 10, cam surface 74 is either ramped or curvilinear to facilitate the gradual engagement of the outer portion of each of drive segments 46 to induce the desired displacement, and in the preferred embodiment its profile approximates a portion of a sine wave. As further shown in FIG. 9, the inner surface of housing 72 includes a low friction layer 76 of material such as Teflon®, nylon, or other such flexible and durable material exhibiting low friction properties. Low friction layer is segmented such that individual flaps 77 (as shown in FIG. 8) are defined at each desired gear diameter for individual displacement by cam surfaces 74 to contact individual segments 46 as they rotate past flaps 77. Since low friction layer 76 has a defined thickness, a shoulder 75 is cut into the face of cams 66 and 70 to facilitate receiving longitudinal edges of material 76 and presenting a relatively continuous cam surface from the surface of material 76 to either of cams 66 or 70 and back to material 76.

Figure 12:
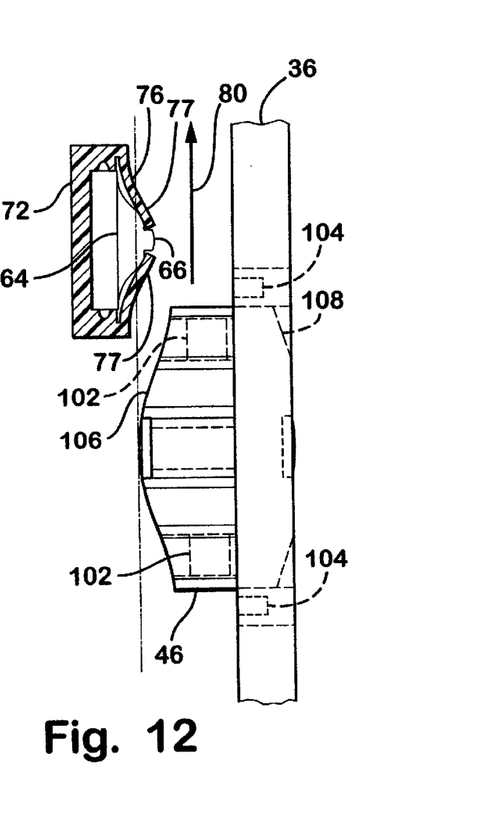
FIG. 12 is an illustrative depiction of a portion of the actuator which is being approached by an extended drive segment which when passing the actuator will be displaced to initiate translation to an opposite face of the disk.

FIG. 12 shows cam 66 translated into the path of a drive segment 46 rotating in the direction indicated by arrow 80. As disk 36 rotates, bearing surface 106 of drive segment 46 contacts flap 77 and cam 66, and segment 46 is displaced toward the opposite face of disk 36. The displacement effected by cam 66 is greater than the gap between the like poles of the oppositely oriented magnets 102 and 104. When segment 46 is so displaced the attractive forces of magnets 102 and 104 operate to accelerate segment 46 through aperture 44 as hereinbefore described. When segment 46 is desired to be translated oppositely, cam 70 is positioned to contact opposite bearing surface 108 of segment 46 and segment 46 is then translated in a like but opposite manner.

Figure 13:
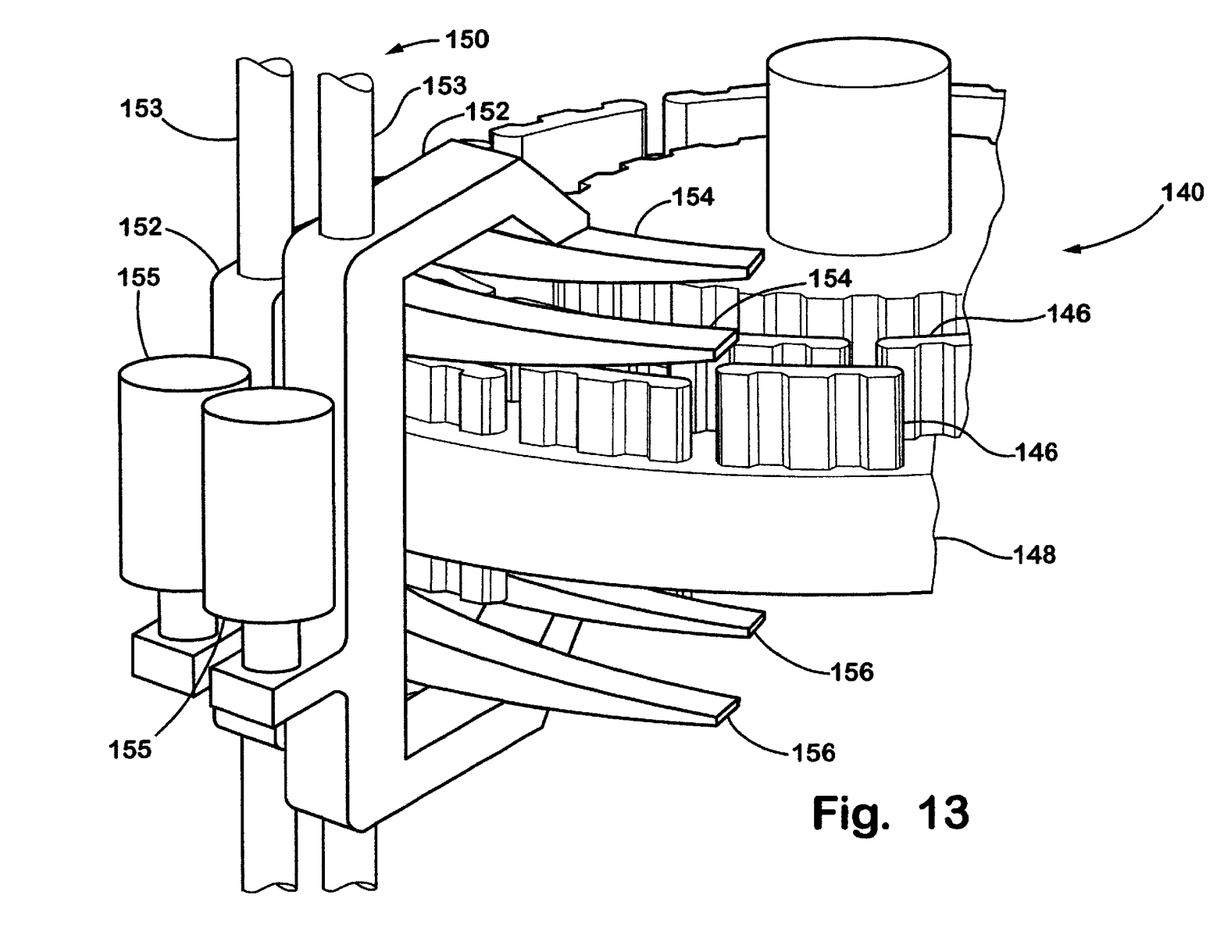
FIG. 13 is an alternate embodiment illustrating individually actuatable cam elements for selectively engaging or retracting individual diameters of drive elements.
Figure 14:
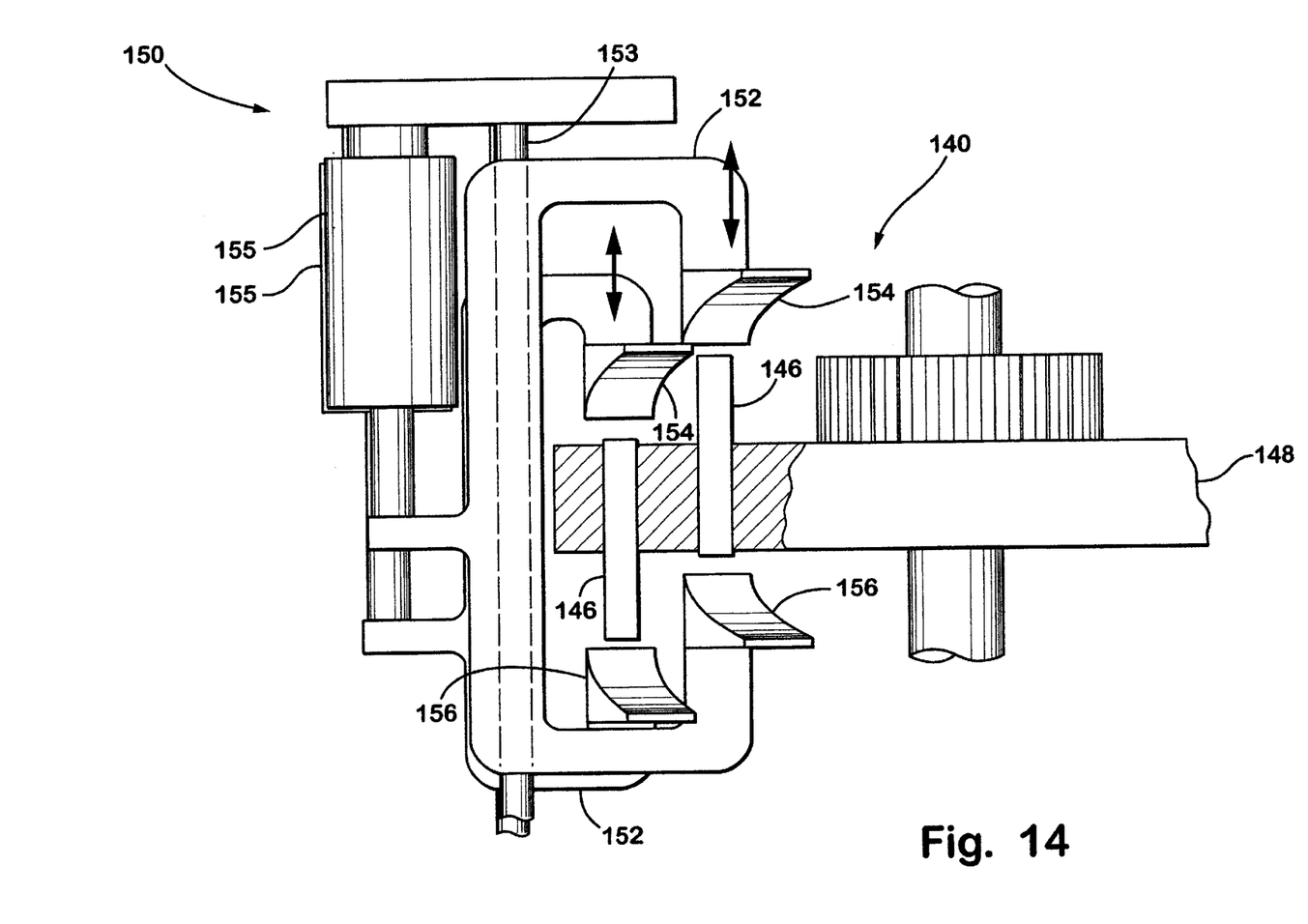
FIG. 14 is an elevational view of the embodiment shown in FIG. 13.

FIGS. 13 and 14 discloses an alternate embodiment 140 of the current invention which includes actuator 150. Actuator 150 comprises separate yokes 152 for each diameter of segments 146 that are desired to be actuated. Each yoke 152 is formed in a C-shape and has attached to each end of the C-shape an upper cam 154 and a lower cam 156. Yoke 152 is guided by guide rod 153 and is translated along guide rod 153 by electric solenoid 155. In this embodiment each diameter of drive segments 146 can be independently extended or retracted through disk 148 by the selective actuation of individual solenoids 155.

Figure 15:
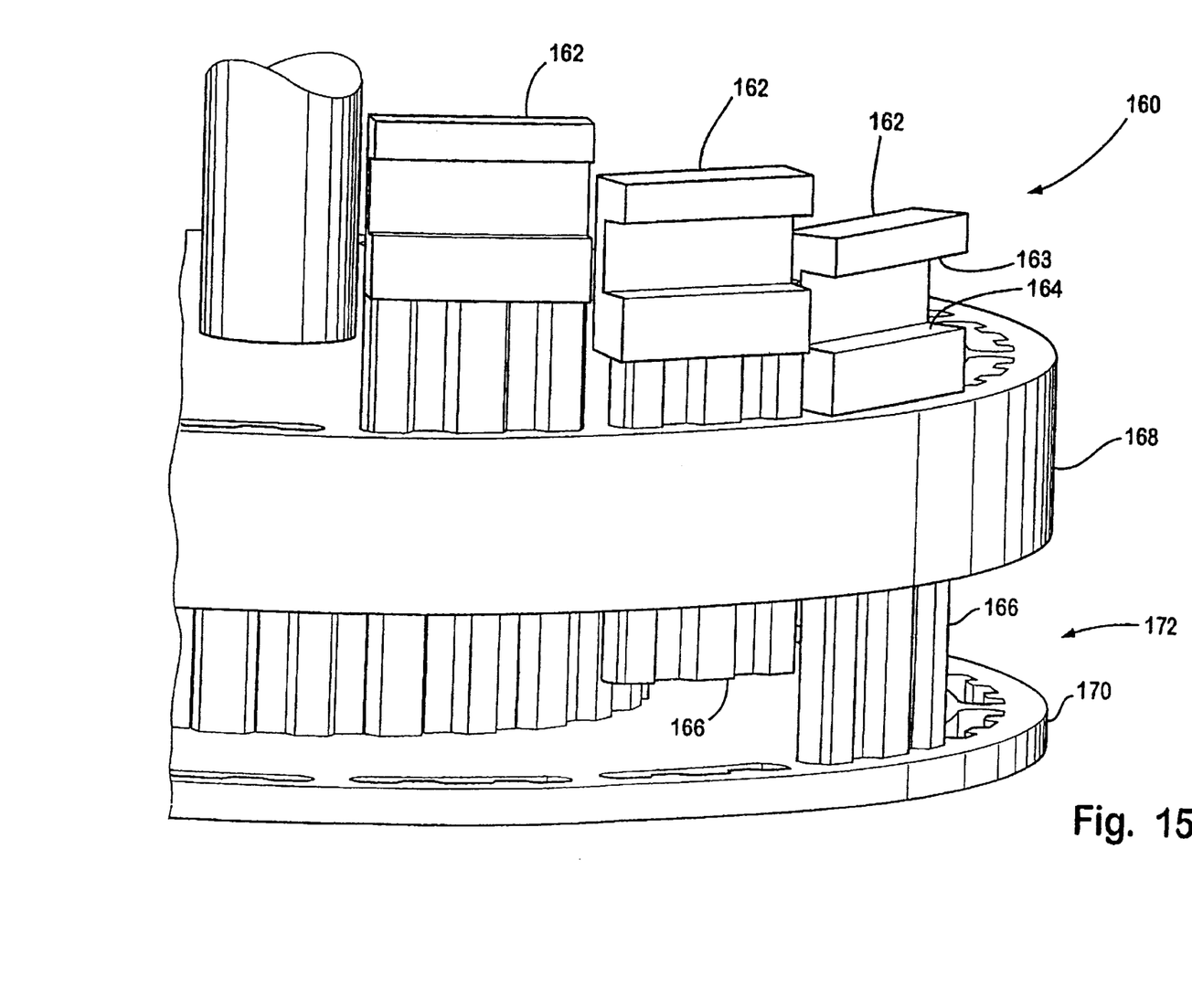
FIG. 15 illustrates another embodiment of the variable ratio pulley including a second parallel disk for support of an end of the drive segments.

FIG. 15 illustrates yet another embodiment 160 wherein drive elements 166 extend through disk 168 into capture plate 170. Disk 168 and capture plate 170 define therebetween a channel in which the flexible member travels to engage elements 166. Capture plate 170 functions solely to support the free end of elements 166. Each element 166 has at an upper end 162 a channel 172 having upper surface 163 and lower surface 164. Surfaces 163 and 164 function as cam surfaces to provide the initial required displacement of element 166 to initiate the magnetic translation of element 166.

Figure 16:
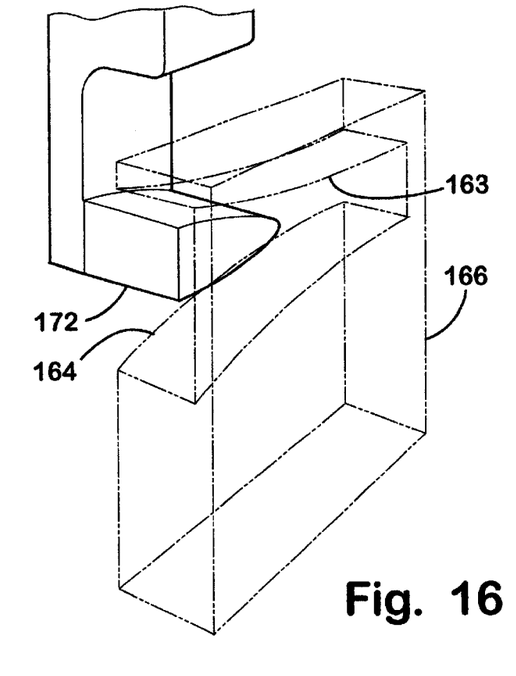
FIG. 16 is a schematic perspective of an alternate embodiment of a cam-segment interface.
Figure 17:
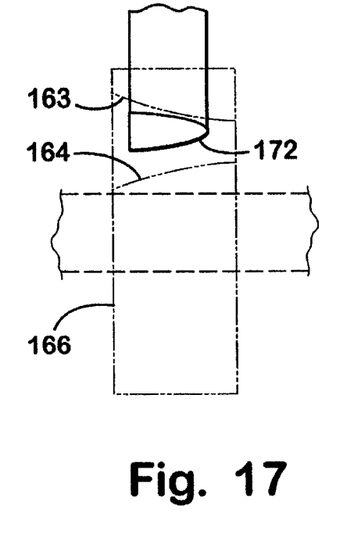
FIG. 17 is a side elevation view of the cam-segment configuration of FIG. 16.
Figure 18:
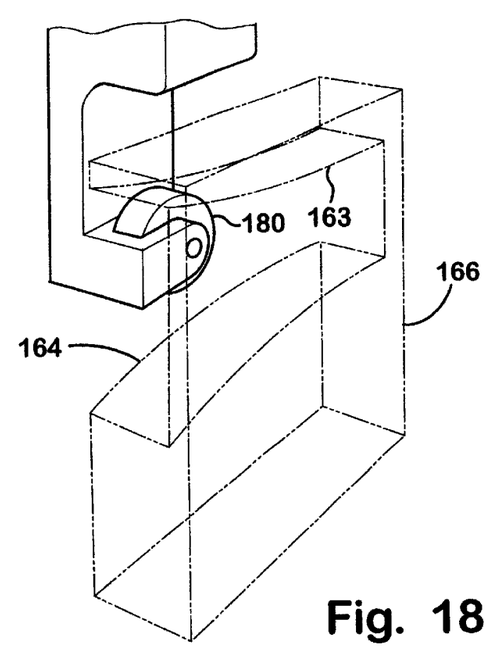
FIG. 18 is an alternate embodiment of a cam-segment interface incorporating a roller.
Figure 19:
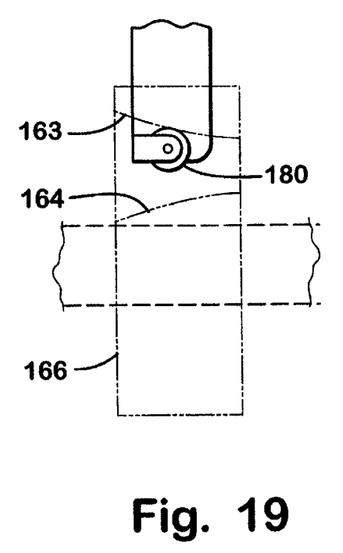
FIG. 19 is a side elevation view of the cam-segment configuration of FIG. 18.

FIGS. 16 and 17 illustrate such a channel having an upper cam surface 163 and lower cam surface 164 which is curvilinear to capture and gradually engage actuating element 172. As actuating element 172 is engaged by either cam surface 163 or 164, drive element 166 is gradually displaced until fully retracted or extended. Drive elements 166 are retained in either the extended or retracted position by magnetic force as hereinbefore described. The channel with cam surfaces 163 can be incorporated into segment 166 or with an actuating element 172 extending therein, or the actuating element can incorporate the channel with drive segment 166 incorporating a fixed element 172 engaging the channel. FIGS. 18 and 19 illustrate the replacement of fixed element 172 with a roller 180, which can also be incorporated either as an actuating element or as the following element on segment 166.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A drive mechanism having a first pulley, a second pulley and an endless flexible drive member extending therebetween for transmitting motion from said first pulley to said second pulley wherein at least one of said pulleys is a variable ratio pulley assembly comprising:

a planar disk of non-magnetic material having an engagement face and an opposite retraction face and further having at least one circular row of apertures therethrough;

at least one fixed magnet having a first pole and a second pole defining a polar orientation, said at least one fixed magnet affixed to said planar disk wherein said polar orientation is substantially transverse to said planar disk;

a plurality of drive segments of non-magnetic material positioned in said row of apertures forming at least one circular row of drive segments wherein each of said segments is selectively translatable along an axis transverse to said planar disk between a retracted position substantially flush with said engagement face and an engaged position extending from said engagement face in a cantilevered fashion, and further wherein each of said segments includes an actuating magnet therein, each said actuating magnet having a first end of a first polarity and a second end of a second polarity aligned parallel to said transverse axis and polarly oriented opposite to said polar orientation of said at least one fixed magnet; and an actuator for selectively engaging and retracting said at least one circular row of drive segments.

2. A drive mechanism as set forth in claim 1, wherein said at least one fixed magnet and said actuator magnets are axially offset one from the other.

3. A drive mechanism as set forth in claim 2, wherein said at least one fixed magnet is positioned between two adjacent ones of said plurality of apertures.

4. A drive mechanism as set forth in claim 3, wherein said at least one fixed magnet and said at least one circular row of apertures are positioned on substantially the same diameter.

5. A drive mechanism as set forth in claim 4, wherein when one of said drive segments is in a retracted position, said actuator magnet of said drive segments and said at least one fixed magnet have respective polar ends of a first opposite polarity most proximate one to the other and define therebetween a first gap.

6. A drive mechanism as set forth in claim 5, wherein when one of said drive segments is in an extended position, said actuator magnet of said drive segments and said at least one fixed magnet have respective polar ends of a second opposite polarity most proximate one to the other and define therebetween a second gap.

7. A drive mechanism as set forth in claim 6, wherein said first gap is greater than said second gap.

8. A drive mechanism as set forth in claim 7, wherein said disk includes a plurality of concentric circular rows of apertures.

9. A drive mechanism as set forth in claim 8, wherein said disk includes a fixed diameter pulley smaller than and concentric to a smallest of said concentric circular rows of apertures.

10. A drive mechanism as set forth in claim 9, wherein said actuator sequentially contacts said drive segments as said disk rotates to selectively engage or retract said drive segments.

11. A drive mechanism as set forth in claim 10, wherein said actuator includes cams for contacting said drive segments.

12. A drive mechanism as set forth in claim 11, wherein said cams displace said drive segments minimally greater than either said first or said second gaps.

13. A drive mechanism as set forth in claim 12, wherein said actuator includes a translatable yoke having a retraction leg and an extension leg.

14. A drive mechanism as set forth in claim 13, wherein said extension leg includes one of said cams for extending said drive segments, and said retraction leg includes one of said cams for retracting said drive segments.

15. A drive mechanism having a first pulley, a second pulley and an endless flexible drive member extending therebetween for transmitting motion from said first pulley to said second pulley wherein at least one of said pulleys is a variable ratio pulley assembly comprising:
 a disk including at least one circular row of apertures, and a drive segment in each of said apertures translatable between a retracted position and an extended position, said drive segments maintained in said retracted or extended position by magnetic force; and
 an actuator further comprising:
 a housing at least partially straddling said disk and in a fixed relation thereto;
 a yoke slidably received in said housing and slidable along a radial of said disk, said yoke having a retraction leg extending at least partially along one side of said disk and a retraction cam on an inner face of said retraction leg, said yoke also having an extension leg extending at least partially along an opposite side of said disk and an extension cam on an inner face of said extension leg; and
 an inner layer of low friction material positioned between each said leg of said yoke and said disk such that contact of one of said cams with said inner layer selectively causes at least a portion of said layer to sequentially contact said drive segments as said disk rotates.

16. A drive mechanism as set forth in claim 15, wherein said inner layer comprises an upper section and a lower section.

17. A drive mechanism as set forth in claim 16, wherein each of said upper section and said lower section comprise at least one tab substantially in lateral registration with said at least one circular row of apertures in said disk.

18. A drive mechanism as set forth in claim 17, wherein at least one of said cams includes a shoulder cut into a surface of said cam.

19. A drive mechanism as set forth in claim 18, wherein an edge of said at least one tab is received by said shoulder when said cam is translated in contact therewith.

20. A drive mechanism as set forth in claim 19, wherein said at least one tab received in said shoulder and a portion of said cam define a substantially continuous surface for sequential contact with said drive segments as said disk rotates.

21. A drive mechanism as set forth in claim 20, wherein said cam surface is curvilinear.

22. A variable ratio drive mechanism comprising:
 a first variable ratio pulley comprising a substantially planar disk having first and second faces and further having at least one circular row of apertures through said disk, at least a first fixed magnet affixed to said disk and defining a first magnetic field having a first polarity, a plurality of drive segments in said apertures forming at least one circular row of drive segments, each said drive segment including a second actuating magnet aligned to define a second magnetic field of opposite polarity from said first magnetic field, and further wherein each said drive segment is selectively translatable through its said aperture between an engaged position and a retracted position such that each said drive segment is maintained in either said selected engaged position or said selected retracted position by said first and second magnetic fields;
 an actuator for selectively engaging and retracting individual ones of said drive segments;
 a second pulley spaced apart from said first variable ratio pulley; and
 an endless flexible drive member extending from said first variable ratio pulley to said second pulley for transmitting motion between said first variable ratio pulley and said second pulley.

23. A variable ratio drive mechanism as set forth in claim 22, wherein said first fixed magnet and said second actuating magnets are axially offset one from the other.

24. A variable ratio drive mechanism as set forth in claim 23, wherein said first fixed magnet is positioned between two adjacent ones of said plurality of apertures.

25. A variable ratio drive mechanism as set forth in claim 24, wherein said at least one fixed magnet and said at least one circular row of apertures are positioned on substantially the same diameter.

26. A variable ratio drive mechanism as set forth in claim 25, wherein when one of said drive segments is in a retracted position, said second actuating magnet of said drive segments and first fixed magnet have respective polar ends of a first opposite polarity most proximate one to the other and define therebetween a first gap.

27. A variable ratio drive mechanism as set forth in claim 26, wherein when one of said drive segments is in an extended position, said second actuating magnet of said drive segments and said first fixed magnet have respective polar ends of a second opposite polarity most proximate one to the other and define therebetween a second gap.

28. A variable ratio drive mechanism as set forth in claim 27, wherein said first gap is greater than said second gap.

* * * * *